United States Patent
Bouma et al.

(10) Patent No.: US 10,445,806 B2
(45) Date of Patent: Oct. 15, 2019

(54) STORE DISPLAY ON-DEVICE DEMONSTRATIONS

(71) Applicant: AT&T Mobility II LLC, Atlanta, GA (US)

(72) Inventors: Jeffrey Bouma, Lynnwood, WA (US); Steven S. Manenti, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 850 days.

(21) Appl. No.: 13/687,459

(22) Filed: Nov. 28, 2012

(65) Prior Publication Data

US 2014/0149255 A1    May 29, 2014

(51) Int. Cl.
*G06Q 30/06* (2012.01)

(52) U.S. Cl.
CPC ................. *G06Q 30/0623* (2013.01)

(58) Field of Classification Search
CPC .......... G06Q 30/0623; G06K 9/6201
USPC ...................................... 705/26.61
See application file for complete search history.

(56) References Cited

U.S. PATENT DOCUMENTS

| | | | |
|---|---|---|---|
| 2002/0120873 A1* | 8/2002 | Salmivalli | 713/201 |
| 2006/0129424 A1* | 6/2006 | Chan | G06Q 30/02 705/1.1 |
| 2006/0265288 A1* | 11/2006 | Aronson | 705/26 |
| 2010/0282836 A1* | 11/2010 | Kempf | G06Q 30/02 235/375 |
| 2010/0325712 A1* | 12/2010 | Kakuta et al. | 726/7 |
| 2011/0214082 A1* | 9/2011 | Osterhout | G02B 27/017 715/773 |
| 2012/0188155 A1* | 7/2012 | Eun et al. | 345/156 |
| 2013/0187953 A1* | 7/2013 | Matsumura | G06K 9/6201 345/633 |
| 2014/0100997 A1* | 4/2014 | Mayerle | G06Q 30/0643 705/27.2 |

OTHER PUBLICATIONS

Zhu, W., Owen, C. B., Li, H., & Lee, J. (2008). Design of the PromoPad: An automated augmented-reality shopping assistant. Journal of Organizational and End User Computing, 20(3), 41-56. doi:http://dx.doi.org/10.4018/joeuc.2008070103 (Year: 2008).*

* cited by examiner

*Primary Examiner* — Kathleen Palavecino
*Assistant Examiner* — Lance Y Cai
(74) *Attorney, Agent, or Firm* — BakerHostetler

(57) ABSTRACT

A communications device, such as mobile device, may be utilized to render information about another device. In an example embodiment, a first mobile device may detect a second device, and the first device may identify the second device. Based on the identification of the second device, the first device may retrieve information associated with the second device. The first device may render the retrieved information on a display of the first device.

17 Claims, 9 Drawing Sheets

STORE DISPLAY ON-DEVICE DEMONSTRATIONS

TECHNICAL FIELD

The technical field generally relates to mobile devices, and more particularly relates to providing interactive interfaces to customers.

BACKGROUND

As visual and audio platforms of mobile devices advance, such platforms are increasingly used to market devices to customers. One approach to marketing a mobile device to a customer is to play an informational video on the mobile device. Many of these marketing approaches, however, are not very effective.

SUMMARY

The following presents a simplified summary that describes some aspects and/or embodiments of the subject disclosure. This summary is not an extensive overview of the disclosure. Indeed, additional or alternative aspects and/or embodiments of the subject disclosure may be available beyond those described in the summary.

A device, such as mobile communications device, may be utilized to render information about another device. For example, a first mobile device may detect a second device, and may identify the second device. Based on the identification of the second device, the first device may retrieve information associated with the second device. The first device may render the retrieved information on a display of the first device. The retrieved information may comprise interactive content that describes the second device. A person, such as a customer in a store for example, may interact with an interface of the first device to perform various operations and/or to learn about the second device. The second device may be detected via any appropriate detecting mechanism or technology such as, for example, visually via a camera, electromagnetically via near field communications, cellular communications, wireless communications, or the like, acoustically, or any appropriate combination thereof. Detection may be implemented using an application that is loaded onto the first device, for example. Such an application may be referred to as an augmented reality application, although detection mechanisms are not limited to augmented reality applications.

In accordance with an example embodiment, content may be updated and/or content may be remotely deployed to a mobile communications device. For example, a control server may receive a communication message from an originator. Based on the received message, the control server may determine an identity associated with an originator of the message. The originator may comprise a mobile communications device. Based on the identity, the control server may determine one or more parameters associated with the originator. Based on the one or parameters, the control server may determine predetermined content that corresponds to the originator. The control server may determine whether the originator of the message comprises the predetermined content. If the originator of the message does not comprise the predetermined content, the control sever may deploy the predetermined content to the originator of the message. For example, the predetermined content may comprise updated content, and it may be deployed via a mobile network, a Wi-Fi network, or the like.

DETAILED DESCRIPTION OF ILLUSTRATIVE EMBODIMENTS

Figure 5:
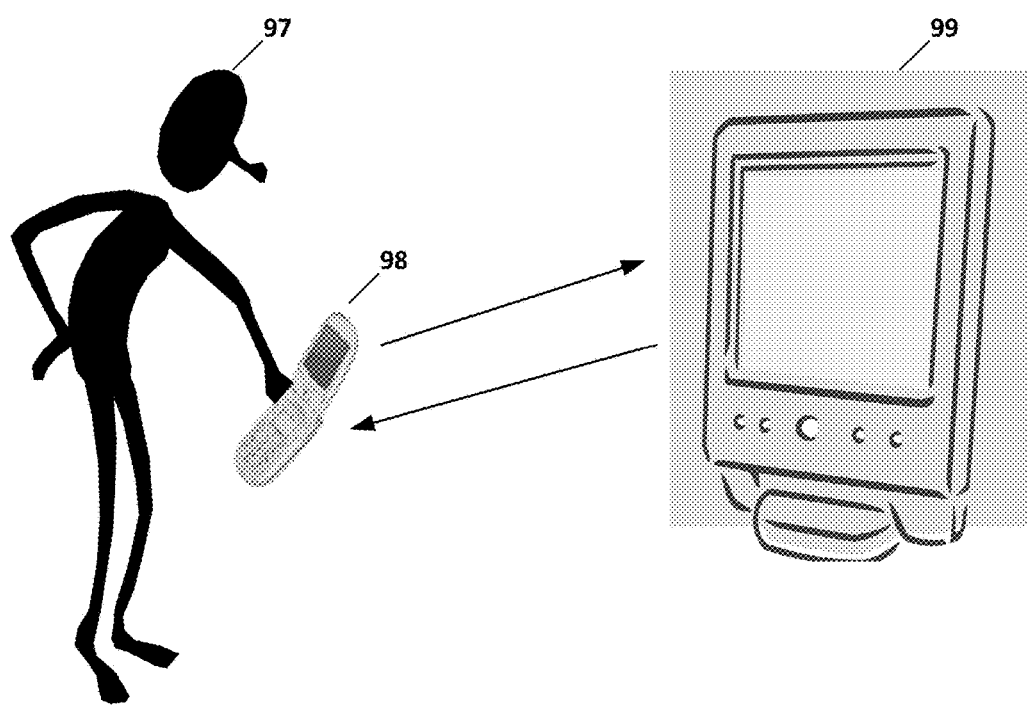
FIG. 5 illustrates an example system and process for rendering content.

FIG. 5 illustrates an example system and process for rendering content. For example, a customer 97 may use a device 98 to view content. The device 98 may comprise a mobile phone, a tablet, a laptop, or the like. The device 98 may detect a device, such as device 99 for example. Device 99 may be any component that is offered for sale in a store. Detection may occur via a variety of mechanisms such as, for example, via visual detection or electromagnetic detection. The device 99 may comprise any device such as a mobile phone or tablet, for example. The customer may use the device 98 to learn about the other device 99. For example, after detecting the device 99, the device 98 may identify the device 99. In an example scenario, the device 99 may identify the device 98 as a mobile phone that is manufactured by a particular company. Based on the identification of the device 99, the device 98 may retrieve information associated with the device 99. Information may be retrieved from various sources including, but not limited to, an external server, the device 99, or memory of the device 98 itself. After retrieving information, the device 98 may render content. Such content may comprise interactive content that describes a device. Interactive content may refer to audio or video that users can manipulate. For example, the device 98 may play audio and/or video for the customer 97 and the device 98 may enable interaction between the customer 97 and the device 98. For example, the customer 98 may use audio commands, commands via touch, or the like to choose user options that are rendered on the device 98. Such options may enable a customer in a store to view video content that describes particular features of a device, learn about promotional offers associated with a device, purchase a device, request help from a salesperson, or the like.

Figure 2:
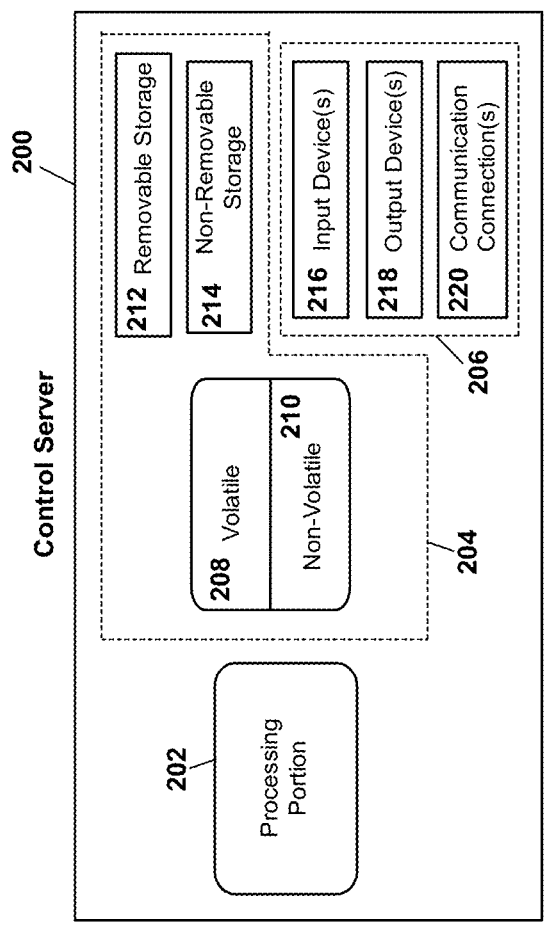
FIG. 2 is a block diagram of an example control server.
Figure 3:
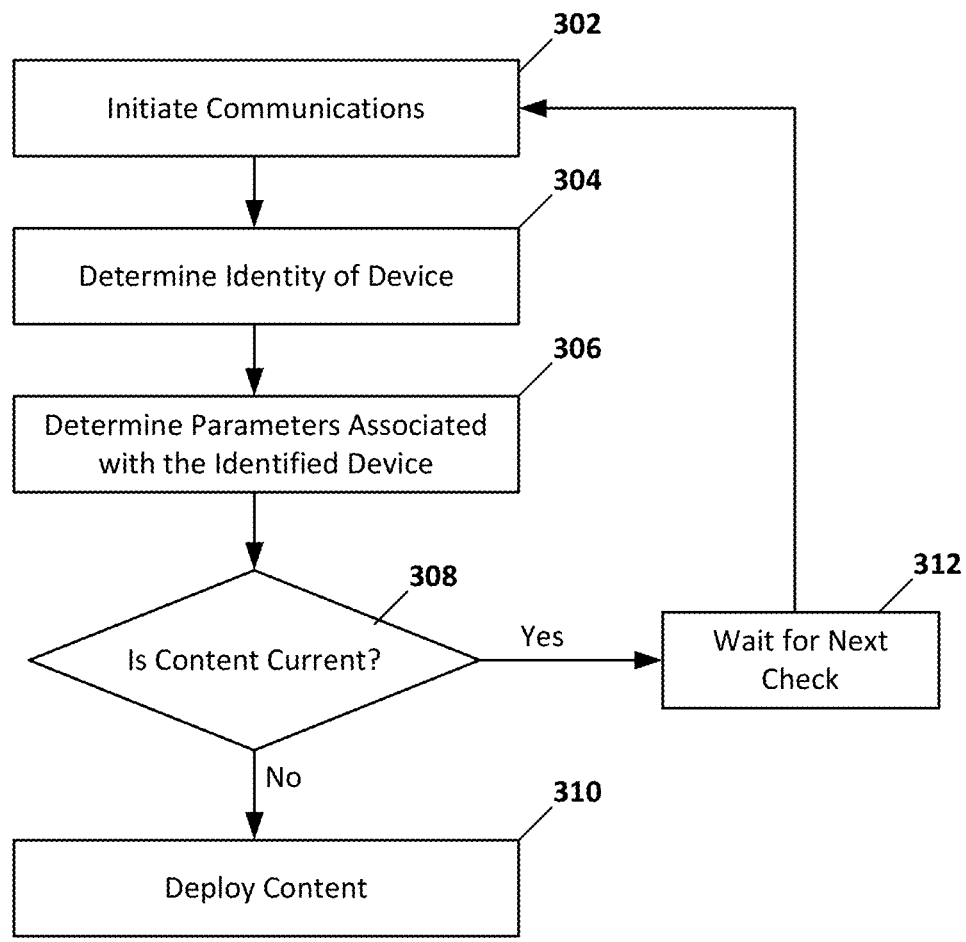
FIG. 3 is a flow diagram of an example process for deploying content to a mobile device.

FIG. 3 illustrates a flow diagram of an example deployment method according to an example embodiment. At step 302, communications may be initiated between a first device, such as the communications device 100 in FIG. 1, and a server, such as the control server 200 in FIG. 2. For example, the control server 200 may receive a message from the device 100. A device 100 may reside in a store and may periodically initiate communications with the control server 200 and identify itself to verify its content. Alternatively, at 302, the control server 200 may initiate communications with a communications device 100 to check a configuration of the device 100. For example, the control server 200 may initiate communications when it is ready to deploy updated content to mobile devices. Checks, whether initiated by the device 100 or the control server 200, may occur daily, hourly, weekly, or in any other appropriate period, or may be triggered at any time. After communications are initiated, at 304, the identity of the device may be determined. For example, the control server 100 may determine an identity associated with the originator of a message that the control server 100 received. For example, the originator may comprise a device 100, and the device 100 may provide its IMEI to the control server 200, or the control server may determine an identity based on indications such as, a model number, a serial number, or the like. At 306, based on the identity of the originator, the control server 200 may determine parameters associated with the originator of the message (e.g., device 100). For example, the control server 200 may determine properties of the device 100 such as its make and model, operating system and version, IMEI, and the like.

Still referring to FIG. 3, at 308, the properties (parameters) of the device 100 may be used to determine whether the device 100 is due for updated content. Based on the determined parameters, the control server 200 may determine predetermined content that corresponds to the originator (e.g., device 100) of the message, and then the control server may determine whether the originator comprises the predetermined content. For example, a version of content from memory 204 may be compared to corresponding content that may be stored on device memory 104. When a mobile device does not comprise the predetermined (e.g., updated) content, and thus fails a content check, the predetermined (e.g., updated) content may be deployed to the device 100 and stored in memory circuitry 104, at 310. Alternatively, if the device 100 passes the content check at 308, the device may return to a standby mode and wait for another check, at 312.

Predetermined content may comprise an updated version of an application, for example. Such an application may comprise interactive content. For example, an application may comprise an interactive demonstration of one or more features of a device. An application, such as a device alive application, may run on devices in stores and may "check in" periodically via Wi-Fi and/or the mobile network. When the device (e.g., an application of the device) checks in, it may identify the device with its properties such as its make and model, operating system and version, IMEI, and the like. During check-in, for example, the control server 200 and/or the device 100 may determine that the device 100 comprises a component that should be updated. An application running on the device 100 may automatically download and install updated files (e.g., menus, graphics, video, code, and the like) and store the files in the memory 104. In an example embodiment, downloads may be restricted to particular IMEIs, for example, so that predetermined devices receive particular updates or versions.

As described herein, a communications device 100 may comprise a demonstration device, for example, to demonstrate properties of a device model for customers in a store. Applications that function on the device, such as a device alive application, may report activity that occurs on the device while the device is in the store. For example, reporting activity may comprise providing the IMEI of a device (phone, tablet, etc.) to the control server 200. The IMEI may be associated with a particular store, such that store activity may be tracked as device activity is tracked. The control server 200 may store information comprising the identity of a device and its associated activity. Store employees may also populate a database comprising activity of the device.

In an example embodiment, the identity of a communications device 100 may be associated with other parameters, such as a type of store in which it is sold or the location of the store in which it is sold, or the like. Content may be deployed to the device 100 based on such parameters. For example, specialized content may be provided to a mobile device based on store parameters. In an example configuration, content may be provided in various languages when one or more store parameters indicate that various languages are used by customers of the store. For example, if a store is located in a region where there are many Spanish speakers, a store parameter associated with a device that is sold in the store may indicate the same, and content may be provided to the device in Spanish. Storing activity information associated with a device may enable particular devices to be targeted for particular promotions. For example, a particular make or model of a phone may be flagged for a bilingual version of content, and the bilingual version may be deployed to the flagged devices during a periodic update. By way of further example, promotions and/or sales may be targeted to particular stores and/or devices, based on information stored in a database in the memory 204 of a control server 200.

Other information and/or content may be stored in the memory 204, for example, that may enable authorized music and/or video content to be loaded onto devices for in-store demonstrations. For example, content such as music tracks, video files, movie trailers, and the like, may be licensed to use. The use of such content may comprise an expiration date and a start date. Via the deployment method described with respect to FIG. 3, for example, licensed content may be deployed to mobile devices in stores for use in demonstration scenarios. A database, such as a database stored in memory 204, may flag dates associated with a license start date and a license expiration date. During the content check at 310 in FIG. 3, for example, the control server 200 may determine whether licensed content can be deployed to a mobile device 100. For example, the control server 200 may determine whether the current date is within the start date and expiration date of the licensed content. If the content is licensed, the content may be deployed to the device 100 at 310. A content server (e.g., control server 200) may also check to determine whether content stored in memory 104 of a device 100 has expired. For example, if a license to content has expired, the server 200 may delete it from the device 100. Alternatively, the expiration date may be stored on the device, and an application stored on the device may be triggered by the expiration date to delete the content with the expired license. As described herein, licensed content, such as music or video, may be deployed to devices based parameters of the stores that they reside in. For example, stores in specific regions may receive specific content.

As described herein, content may be remotely deployed to demonstration devices in stores. For example, when a device, such as phone or tablet, checks in with a server, it may be flagged for a content push. Such content may include special promotions or discounts that are targeted for particular devices. For example, default content may be deployed to devices that are not flagged. Default content may include standard pricing information. For example, a demonstration application may run on the device 100, and a price (e.g., standard or discount) of the device 100 may be displayed to a customer via the screen (e.g., UI circuitry 108). Using the deployment process described herein with respect to FIG. 3, devices may display discounted prices. When the promotional period expires, the device may remove the discounted prices from memory and display the standard price. In an example embodiment, discounted prices and promotions may be retrieved by the control server 204 during check-in, and prices may be updated automatically. For example, a change in the price at the control server 200 may trigger the control server 200 to update content on devices accordingly. If a device 100 fails to connect to the control server 200 during a periodic check-in, for example, the device 100 may display its default (e.g., standard) price. Such a default may ensure that disconnected devices do not display an expired offer. Prices of devices may correspond to various contract terms. Such terms may also be displayed on the screen of the device 100 as part of video content deployed on the device 100.

As described herein, customers may learn about a device by playing various video and/or audio content on a device. For example, a user/customer may activate content on a device by touching a link on the screen (e.g., UI circuitry 108). For example, the screen of the device 100 may render a link to enter a sweepstakes. If the customer touches the link, access to a web-based entry form may be provided. Such a web-based entry form may be hosted off of the device. For example, a sweepstakes entry may be offered in exchange to a user in exchange for watching a promotional video about a phone/tablet/feature/accessory that is played on the screen of that device. The promotional video content may play through an application, such as a device alive application, that is loaded onto particular demonstration devices (e.g., phones) in stores.

In another example embodiment, a web page of a company that provides sweepstake services may open upon completion of a video. The mobile webpage may verify authenticity of the device, such as by verifying make and model, to ensure that entries originate from the device. For example, customers may enter their contact information and that information may be housed and maintained with administrators of the sweepstakes. Thus, contact information would not reside on the phone in accordance with an example configuration. Upon completion of the form, the browser window on the phone may close, and the phone may reset for the next customer to experience the device. In an example configuration, customers may have the option to watch the videos without registering for the sweepstakes.

Figure 4:
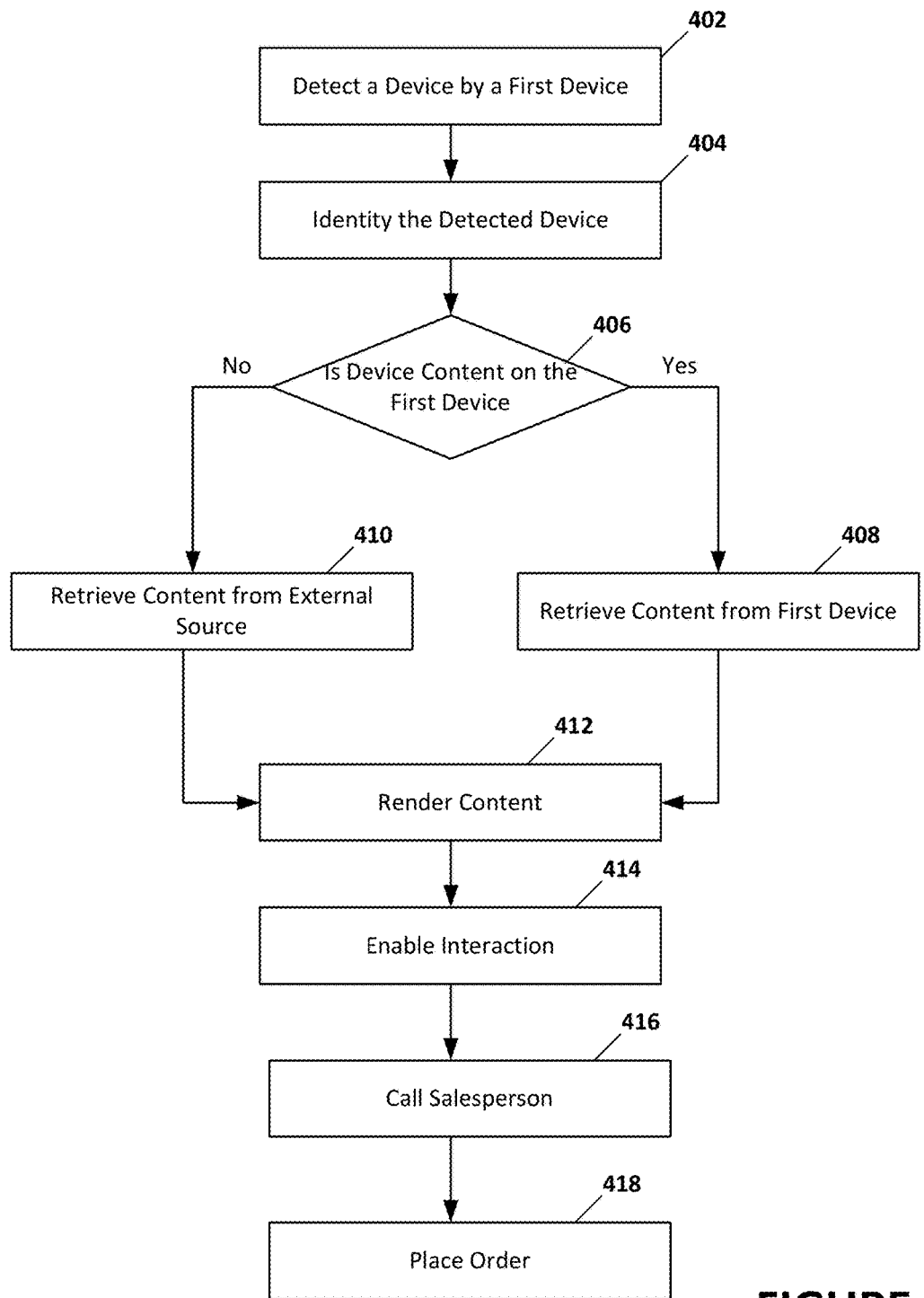
FIG. 4 is a flow diagram of an example process for triggering content to be rendered on a mobile device.

FIG. 4 is a flow diagram of a method for triggering content according to an example embodiment. Referring to FIG. 4, at 402, a first device (e.g., communications device 100) may comprise an application for detecting other devices, such as an augmented reality application. The first device may detect a second device such as, for example, a phone, tablet, or the like, that a customer wants to learn about. Detection may occur via visually detecting, via electromagnetically detecting, or any other appropriate detecting mechanism. At 404, the first device may identify the second device. The first device may detect and identify the second device using a variety of mechanisms. For example, visually detection may occur when a customer points a camera (e.g., video camera portion 112 of sensor circuitry 110) at the second device and the first device visually detects an identifier of the second device. The first device may create an image of the second device. Such an image, for example, may comprise a specific logo. The first device may match the image (e.g., specific logo) with an associated identifier of the device that is stored internally on the first device or externally to the first device. The identifier may comprise a model number, a make type, or other parameter that identifies the device. For example, the memory 104 of a device 100 may comprise images, such as logos, of various devices with corresponding identifiers. Alternatively, the first device may send a signal, via a mobile network, Wi-Fi, or the like, that may trigger a response from the second device. The response may comprise an indication of the identity of the second device such as its IMEI, make, mode, or the like. In yet another embodiment, the first device may comprise specially equipped glasses that are configured to detect a device and render images associated with the identified device.

Still referring to FIG. 4, after the second device is identified, the first device may determine whether information associated with the second device is stored in the memory of the first device, at 406. For example, content may be updated periodically in an application on a phone (see FIG. 3). In a configuration in which a camera is used by the first device to create an image of the second device, the first device may determine whether information associated with the second device is stored on the first device by matching the created image with an image that is stored on the first device. For example, when a match of the image in the first device is made with an image seen by the camera, such as a logo or the like, the first device may retrieve content that is stored on the first device, at 408. At 412, content associated with the second device may be rendered and additional images may be rendered, for example, on the screen of the first device. Such content may be interactive and may provide information about the second device. If the test at 406 determines that content associated with the second device is not stored on the first device, the first device may retrieve content associated with the second device from an external source, such as the control server 200. For example, the control server 200 may deploy content to the first device 100, as described herein (e.g., see FIG. 3). After the content is deployed, the content may be rendered on a display (e.g., UI circuitry 108) of the first device, at 412. Once the content is retrieved, the content that is rendered on a display of the first device may comprise interactive content that describes features, accessories, pricing information, and/or properties of the first device.

For example, images and/or audio that is associated with the second device may be rendered by the first device. Rendered images may comprise a semi-transparent visual that may be static information on a screen or animated information on the screen. At 414, the rendered images on the first device may enable interaction by the user of the device with the content that is rendered on the device, for example, to view other content or place commands. For example, at 416, a user of the first device may activate a link that calls a salesperson to the user's location. Thus, a salesperson may be called to the location of the first device in response to a user interaction with the first device. A user may activate a link and/or provide commands using a variety of mechanisms such as, for example, by touching a link on the screen, rendering a voice command, selecting a link using a cursor, or the like. The content that is rendered on the first device may allow the customer to place an order, at 418.

For example, a customer may activate an option to purchase the second device or a device that comprises the features of the second device.

Figure 1:
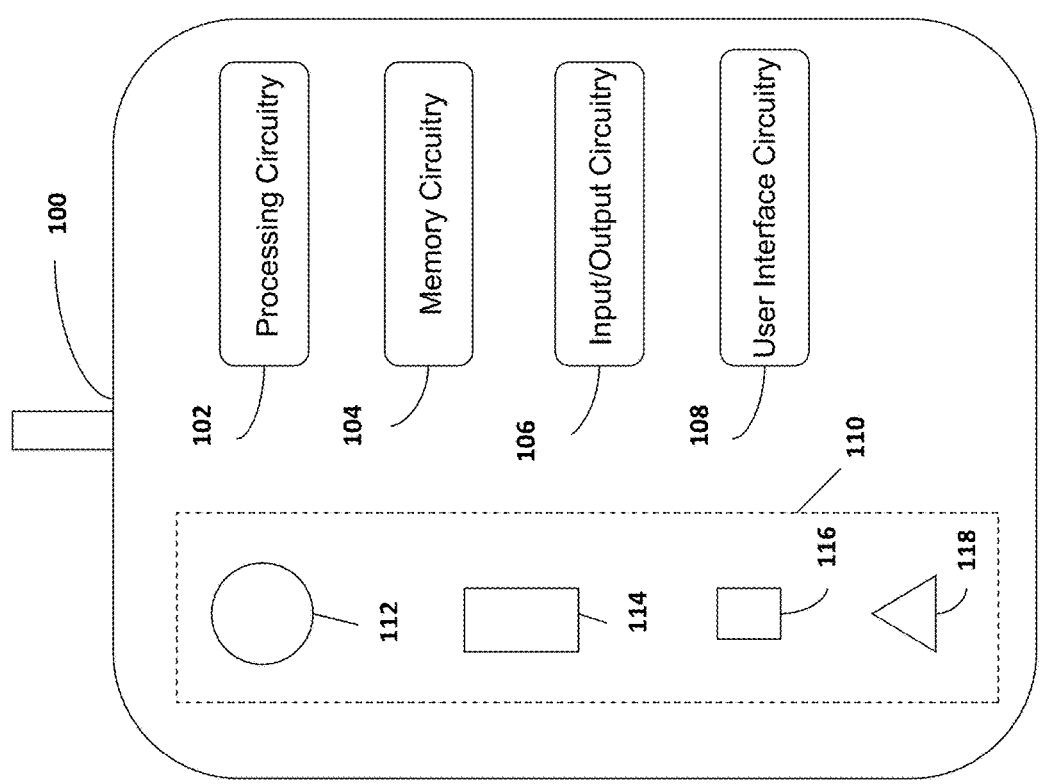
FIG. 1 is a block diagram of an example wireless communications device that is configurable to provide an interactive interface.

FIG. 1 is a block diagram of an example wireless communications device 100 that is configurable to interface with a user or customer. The communications device 100 may include any appropriate device and/or mechanism for interfacing with a customer as described herein. As described herein, the communications device 100 may comprise hardware, or a combination of hardware and software. In an example configuration, the communications device 100 may comprise processing circuitry 102, memory circuitry 104, input/output circuitry 106, user interface (UI) circuitry 108, and sensor circuitry 110 comprising at least one of a video camera portion 112, a force/wave sensor 114, a microphone 116, a moisture sensor 118, or a combination thereof. The force/wave sensor may comprise at least one of a motion detector, an accelerometer, an acoustic sensor, a tilt sensor, a pressure sensor, a temperature sensor, or the like. The motion detector may be configured to detect motion occurring outside of the communications device, for example via disturbance of a standing wave, via electromagnetic and/or acoustic energy, or the like. The accelerator may be capable of sensing acceleration, motion, and/or movement of the communications device. The acoustic sensor may be capable of sensing acoustic energy, such as a loud noise, for example. The tilt sensor may be capable of detecting a tilt of the communications device. The pressure sensor may be capable of sensing pressure against the communications device, such as from a shock wave caused by broken glass or the like. The temperature sensor may be capable of sensing a measuring temperature, such as inside of the vehicle, room, building, or the like. The moisture sensor 118 may be capable of detecting moisture, such as detecting if the communications device 100 is submerged in a liquid. The processing circuitry 102, memory circuitry 104, input/output circuitry 106, user interface (UI) circuitry 108, video camera portion 112, force/wave sensor 114, and microphone 116 may be coupled together to allow communications therebetween (coupling not shown in FIG. 1). The communications device may comprise a timer (not depicted in FIG. 1).

In various embodiments, the input/output circuitry 106 comprises a receiver of the communications device 100, a transmitter of the communications device 100, or a combination thereof. The input/output circuitry 106 is capable of receiving and/or providing information pertaining to interfacing with a customer as described herein. The input/output circuitry 106 also may be capable of communications with a wireless network, a web server, or the like, as described herein. For example, the input/output circuitry 106 may include a wireless communications (e.g., 2.5 G/3 G/4 G) SIM card. The input/output circuitry 106 may be capable of receiving and/or sending video information, audio information, control information, image information, data, or any combination thereof. In an example embodiment, the input/output circuitry 106 may be capable of receiving and/or sending information to determine a location of the communications device 100. In an example configuration, the input\output circuitry 106 may comprise a GPS receiver. In an example configuration, the communications device 100 may determine its own geographical location through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output circuitry 106 may receive and/or provide information via any appropriate means, such as, for example, optical means (e.g., infrared), electromagnetic means (e.g., RF, Wi-Fi, BLUETOOTH, ZIGBEE, etc.), acoustic means (e.g., speaker, microphone, ultrasonic receiver, ultrasonic transmitter), or any appropriate combination thereof. In an example configuration, the input/output circuitry 106 may comprise a Wi-Fi finder, a two way GPS chipset or equivalent, or the like.

The processing circuitry 102 may be capable of sensing and identifying a mobile device as described herein. For example, the processing circuitry 102 may be capable of, in conjunction with any other portion of the communications device 100, executing an application for identifying a mobile device, generating an image of a mobile device, determining whether installed content is current, deploying updated content, deleting content, rendering content to a user, communication with a relay center via a text message and/or voice message, processing user interactions with deployed content, processing a received voice or text message, processing a retrieved text message, processing a retrieved voice message, generating a predetermined message, retrieving a predetermined message, processing non-voice messages provided via the user interface circuitry 108, processing voice messages provided via the user interface portion 108, processing text messages received via the input/output circuitry 106, processing voice messages received via the input/output circuitry 106, or the like, or any combination thereof. The processing circuitry 102, in conjunction with any other portion of the communications device 100, may provide the ability for users/subscribers/customers to enable, disable, and configure various features of an application for rendering demonstration content and interacting with rendered content, as described herein.

In a basic configuration, the communications device 100 may include at least one memory circuitry 104. The memory circuitry 104 may be able to store any information utilized in conjunction with interfacing with a customer as described herein. For example, the memory circuitry 104 may be capable of storing information pertaining to an augmented reality application for matching images captured by the camera to images in a database, generating a non-voice message, generating a voice message, communication with a web server via a text message and/or voice message, communication with a call center via a text message and/or voice message, processing a received text message, processing a received voice message, processing a retrieved text message, processing a retrieved voice message, generating a predetermined message, retrieving a predetermined message, processing non-voice messages provided via the user interface circuitry 108, processing voice messages provided via the user interface portion 108, processing text messages received via the input/output circuitry 106, processing voice messages received via the input/output circuitry 106, determining if information associated with a device exists, placing a call on hold, establishing a multi-party call, or the like, or any appropriate combination thereof. Depending upon the exact configuration and type of processor, the memory circuitry 104 may be volatile (such as some types of RAM) and/or non-volatile (such as ROM, flash memory, etc.). The communications device 100 may include additional storage (e.g., removable storage and/or non-removable storage) including, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or the like. In an example configuration, the memory circuitry 104, or a portion of the memory circuitry 104 may be hardened such that information stored therein can be recovered if the communications device 100 is exposed to extreme heat, extreme vibration, extreme moisture, corrosive chemicals or gas, or the like. In an example configuration, the information stored in the hardened portion of the memory circuitry 104 may be encrypted, or otherwise rendered unintelligible without use of an appropriate cryptographic key, password, biometric (voiceprint, fingerprint, retinal image, facial image, or the like). Wherein, use of the appropriate cryptographic key, password, biometric may render the information stored in the hardened portion of the memory circuitry 104 intelligible.

The communications device 100 also may contain UI circuitry 108 allowing a user, such as a customer, to communicate with the communications device 100. The UI circuitry 108 may be capable of rendering any information utilized in conjunction with interfacing with a customer as described herein. For example, the UI circuitry 108 may contain circuitry for entering text, entering a phone number, rendering text, rendering images, rendering multimedia, rendering sound, rendering video, receiving sound, rendering auxiliary information associated with the use, or the like, as described herein. The UI circuitry 108 may provide the ability to control the communications device 100, via, for example, buttons, soft keys, voice actuated controls, a touch screen, movement of the mobile communications device 100, visual cues (e.g., moving a hand in front of a camera on the mobile communications device 100), or the like. The UI circuitry 108 may provide visual information (e.g., via a display), audio information (e.g., via speaker), mechanically (e.g., via a vibrating mechanism), or a combination thereof. In various configurations, the UI circuitry 108 may comprise a display, a touch screen, a keyboard, a speaker, or any combination thereof. The UI circuitry 108 may comprise circuitry for inputting biometric information, such as, for example, fingerprint information, retinal information, voice information, and/or facial characteristic information. The UI circuitry 108 may be utilized to enter an indication of the designated destination (e.g., the phone number, IP address, or the like).

In an example embodiment, the sensor circuitry 110 of the communications device 100 may comprise the video camera portion 112, the force/wave sensor 114, and the microphone 116. The video camera portion 112 may comprise a camera (or cameras) and associated equipment capable of capturing still images and/or video and to provide the captured still images and/or video to other portions of the communications device 100. In an example embodiment, the force/wave sensor 114 may comprise an accelerometer, a tilt sensor, an acoustic sensor capable of sensing acoustic energy, an optical sensor (e.g., infrared), or any combination thereof.

FIG. 2 is a block diagram of an example control server 200. In an example embodiment, the control server 200 comprises hardware or a combination of hardware and software. The functionality needed to facilitate deploying content to mobile communication devices may reside in any one or combination of control servers. The control server 200 depicted in FIG. 2 represents any appropriate entity, apparatus, or combination of entities or apparatuses, such as a processor, a server, a gateway, etc., or any combination thereof. It is emphasized that the block diagram depicted in FIG. 2 is exemplary and not intended to imply a specific implementation or configuration. Thus, the control server 200 may be implemented in a single processor or multiple processors (e.g., single server or multiple servers, single gateway or multiple gateways, etc.). Multiple servers may be distributed or centrally located. Multiple servers may communicate wirelessly, via hard wire, or a combination thereof.

In an example configuration, the control server 200 may comprise processing circuitry 202, memory circuitry 204, and input/output circuitry 206. The processing circuitry 202, memory circuitry 204, and input/output circuitry 206 are coupled together (coupling not shown in FIG. 2) to allow communications therebetween. The processing circuitry 202 may be capable of performing functions associated with analyzing and deploying content to a mobile communication device, as described herein. For example, the processing circuitry 202 may be capable of, in conjunction with any other portion of the control server 200, executing an application for providing specialized content to a mobile communication device, generating a non-voice message, generating a voice message, determining content associated with a particular store, communication via a text message and/or voice message, processing a received text message, processing a received voice message, processing a retrieved text message, processing a retrieved voice message, generating a predetermined message, retrieving a predetermined message, processing text messages received via the input/output circuitry 206, processing voice messages received via the input/output circuitry 206, determining if a deployment need exists, determining if a mobile device is formatted with appropriate content, or the like, or any combination thereof. The processing circuitry 202, in conjunction with any other portion of the protocol server 200, may provide the ability for users to enable, disable, and configure various features of an application for analyzing, generating, and deploying content to a mobile device, as described herein. The processing circuitry 202, in conjunction with any other portion of the communications device 100, may enable the control server 200 to verify content that is loaded onto the communications device 100 when it is configured to update software.

The input/output circuitry 206 may be capable of receiving and/or providing information from/to a device (e.g., communications device 200), other servers, and/or call centers, when deploying content to a mobile device, as described herein. The input/output circuitry 206 may be capable of communications with a wireless network via communication connections 220. For example, the input/output circuitry 206 may include a wireless communications (e.g., 2.5G/3G/4G) SIM card. The input/output circuitry 206 may be capable of receiving and/or sending video information, audio information, control information, image information, data, or any combination thereof. In an example embodiment, the input/output circuitry 206 may be capable of receiving and/or sending information to determine a location of a communications device (e.g., communications device 100). For example, the input/output circuitry 206 may be capable of receiving and/or sending information to determine a store location of a communications device, such as a store in which the device is offered for sale. In an example configuration, the input\output circuitry 206 may comprise a GPS receiver. In an example configuration, a geographical location may be determined through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output circuitry 206 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or any appropriate combination thereof. In an example configuration, the input/output circuitry may comprise a Wi-Fi finder, a two way GPS chipset or equivalent, or the like.

The memory circuitry 204 may store any information utilized in conjunction with analyzing and deploying appropriate content to a communications device, as described herein. For example, the memory circuitry 204 may be capable of storing information pertaining to executing an application for determining an identity of a communications device, determining an identity of a store associated with a communications device, generating content to be deployed to a communications device, processing a received voice message, processing a retrieved text message, processing a retrieved voice message, generating a predetermined message, retrieving a predetermined message, processing text messages received via the input/output circuitry 206, processing voice messages received via the input/output circuitry 206, determining content that corresponds to a received message, analyzing a platform of a mobile device, maintaining multi-mode communications, or the like, as described herein, or any appropriate combination thereof. In an example embodiment, the memory circuitry 204 may be capable of storing information associated with various communication devices and/or stores associated with communication devices. Such information may include, for example, store locations, languages associated with a store, versions of hardware and/or software that have been previously loaded onto a communications device, or the like.

Depending upon the exact configuration and type of control server 200, the memory circuitry 204 may include computer storage media that is volatile 208 (such as dynamic RAM), non-volatile 210 (such as ROM), or a combination thereof. The control server 200 may include additional storage, in the form of computer storage media (e.g., removable storage 212 and/or non-removable storage 214) including, RAM, ROM, EEPROM, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory. As described herein, a computer storage medium is an article of manufacture and thus not a transient signal.

The control server 200 also may contain communications connection(s) 220 that allow the control server 200 to communicate with other devices, entities, databases, servers, or the like. A communications connection(s) can comprise communication media. Communication media may be used to communicate computer readable instructions, data structures, program modules, or other data. Communication media can include an appropriate transport mechanism or information delivery media that may be used to transport a modulated data signal such as a carrier wave.

The control server 200 also may include input device(s) 216 such as keyboard, mouse, pen, voice input device, touch input device, etc. Output device(s) 218 such as a display, speakers, printer, etc. also can be included. Communications devices (e.g., communications device 100) and servers (e.g., control server 200) may be part of and/or in communication with various wireless communications networks.

In an example embodiment, specialized and/or versioned content may be remotely deployed to a communications device. For example, such content may be provided to a communications device 100 via a control server 200. Example content includes, but is not limited to, a device alive application, a demonstration loop, or other appropriate interfaces that may be used to market the device to a customer. As used herein, a device alive application may refer to an audio and/or visual interface that enables a user to learn about properties and/or functions of the device. For example, users may view videos and touch the screen of the device to select various options, such as options for learning about specific hardware or versions of the device. In an example embodiment, the control server 200 may periodically verify and/or deploy content based on an identity, such as the international mobile equipment identity (IMEI), of the device 100.

FIG. 3 illustrates a flow diagram of an example deployment method according to an example embodiment. At step 302, communications may be initiated between a first communications device 100 and a control server 200. For example, a communications device 100 residing in a store may periodically initiate communications with the control server 200 and identify itself to verify its content. Alternatively, at 302, the control server 200 may initiate communications with a communications device 100 to check a configuration of the device 100. For example, the control server 200 may initiate communications when it is ready to deploy updated content to mobile devices. Checks, whether initiated by the device 100 or the control server 200, may occur daily, hourly, weekly, or in any other appropriate period, or may be triggered at any time. After communications are initiated, at 304, the identity of the device may be determined. For example, a device may provide its IMEI to the control server 200, or the control server may determine an identity based on indications such as, a model number, a serial number, or the like. At 306, based on the identification of the device 100, the control server 200 may determine parameters associated with the device 100. For example, the control server 200 may determine properties of the device 100 such as its make and model, operating system and version, IMEI, and the like.

Still referring to FIG. 3, at 308, the properties of the device 100 may be used to determine whether the device 100 is due for updated content. For example, a version of content from memory 204 may be compared to corresponding content that may be stored on device memory 104. When a mobile device does not comprise appropriate (e.g., updated) content, and thus fails a content check, the updated content may be deployed to the communications device 100 and stored in memory circuitry 104, at 310. Alternatively, if the device 100 passes the content check at 308, the device may return to a standby mode and wait for another check, at 312.

An application, such as a device alive application, may run on devices in stores and may "check in" periodically via Wi-Fi and/or the mobile network. When the device (e.g., an application of the device) checks in, it may identify the device with its properties such as its make and model, operating system and version, IMEI, and the like. During check-in, for example, the control server 200 and/or the device 100 may determine that the device 100 comprises a component that should be updated. An application running on the device 100 may automatically download and install updated files (e.g., menus, graphics, video, code, and the like) and store the files in the memory 104. In an example embodiment, downloads may be restricted to particular IMEIs, for example, so that predetermined devices receive particular updates or versions.

As described herein, a communications device 100 may comprise a demonstration device, for example, to demonstrate properties of a device model for customers in a store.

Applications that function on the device, such as a device alive application, may report activity that occurs on the device while the device is in the store. For example, reporting activity may comprise providing the IMEI of a device (phone, tablet, etc.) to the control server 200. The IMEI may be associated with a particular store, such that store activity may be tracked as device activity is tracked. The control server 200 may store information comprising the identity of a device and its associated activity. Store employees may also populate a database comprising activity of the device.

In an example embodiment, the identity of a communications device 100 may be associated with other parameters, such as a type of store in which it is sold or the location of the store in which it is sold, or the like. Content may be deployed to the device 100 based on such parameters. For example, specialized content may be provided to a mobile device based on store parameters. In an example configuration, content may be provided in various languages when one or more store parameters indicate that various languages are used by customers of the store. For example, if a store is located in a region where there are many Spanish speakers, a store parameter associated with a device that is sold in the store may indicate the same, and content may be provided to the device in Spanish. Storing activity information associated with a device may enable particular devices to be targeted for particular promotions. For example, a particular make or model of a phone may be flagged for a bilingual version of content, and the bilingual version may be deployed to the flagged devices during a periodic update. By way of further example, promotions and/or sales may be targeted to particular stores and/or devices, based on information stored in a database in the memory 204 of a control server 200.

Other information and/or content may be stored in the memory 204, for example, that may enable authorized music and/or video content to be loaded onto devices for in-store demonstrations. For example, content such as music tracks, video files, movie trailers, and the like, may be licensed to use. The use of such content may comprise an expiration date and a start date. Via the deployment method described with respect to FIG. 3, for example, licensed content may be deployed to mobile devices in stores for use in demonstration scenarios. A database, such as a database stored in memory 204, may flag dates associated with a license start date and a license expiration date. During the content check at 310 in FIG. 3, for example, the control server 200 may determine whether licensed content can be deployed to a mobile device 100. For example, the control server 200 may determine whether the current date is within the start date and expiration date of the licensed content. If the content is licensed, the content may be deployed to the device 100 at 310. A content server (e.g., control server 200) may also check to determine whether content stored in memory 104 of a device 100 has expired. For example, if a license to content has expired, the server 200 may delete it from the device 100. Alternatively, the expiration date may be stored on the device, and an application stored on the device may be triggered by the expiration date to delete the content with the expired license. As described herein, licensed content, such as music or video, may be deployed to devices based parameters of the stores that they reside in. For example, stores in specific regions may receive specific content.

As described herein, content may be remotely deployed to demonstration devices in stores. For example, when a device, such as phone or tablet, checks in with a server, it may be flagged for a content push. Such content may include special promotions or discounts that are targeted for particular devices. For example, default content may be deployed to devices that are not flagged. Default content may include standard pricing information. For example, a demonstration application may run on the device 100, and a price (e.g., standard or discount) of the device 100 may be displayed to a customer via the screen (e.g., UI circuitry 108). Using the deployment process described herein with respect to FIG. 3, devices may display discounted prices. When the promotional period expires, the device may remove the discounted prices from memory and display the standard price. In an example embodiment, discounted prices and promotions may be retrieved by the control server 204 during check-in, and prices may be updated automatically. For example, a change in the price at the control server 200 may trigger the control server 200 to update content on devices accordingly. If a device 100 fails to connect to the control server 200 during a periodic check-in, for example, the device 100 may display its default (e.g., standard) price. Such a default may ensure that disconnected devices do not display an expired offer. Prices of devices may correspond to various contract terms. Such terms may also be displayed on the screen of the device 100 as part of video content deployed on the device 100.

As described herein, customers may learn about a device by playing various video and/or audio content on a device. For example, a user/customer may activate content on a device by touching a link on the screen (e.g., UI circuitry 108). For example, the screen of the device 100 may render a link to enter a sweepstakes. If the customer touches the link, access to a web-based entry form may be provided. Such a web-based entry form may be hosted off of the device. For example, a sweepstakes entry may be offered in exchange to a user in exchange for watching a promotional video about a phone/tablet/feature/accessory that is played on the screen of that device. The promotional video content may play through an application, such as a device alive application, that is loaded onto particular demonstration devices (e.g., phones) in stores.

In another example embodiment, a web page of a company that provides sweepstake services may open upon completion of a video. The mobile webpage may verify authenticity of the device, such as by verifying make and model, to ensure that entries originate from the device. For example, customers may enter their contact information and that information may be housed and maintained with administrators of the sweepstakes. Thus, contact information would not reside on the phone in accordance with an example configuration. Upon completion of the form, the browser window on the phone may close, and the phone may reset for the next customer to experience the device. In an example configuration, customers may have the option to watch the videos without registering for the sweepstakes.

FIG. 4 is a flow diagram of a method for triggering content according to an example embodiment. Referring to FIG. 4, at 402, a first device (e.g., communications device 100) may comprise an application for sensing other devices, such as an augmented reality application. The first device may detect a second device such as, for example, a phone, tablet, or the like, that a customer wants to learn about. At 404, the first device may identify the second device. The first device may detect and identify the second device using a variety of mechanisms. For example, a customer may point a camera (e.g., video camera portion 112 of sensor circuitry 110) at the second device and create an image of the second device. Such an image, for example, may comprise a specific logo. The first device may match the image (e.g., specific logo) with an associated identity of the device. For example, the memory 104 of a device 100 may comprise images, such as logos, of various devices with corresponding identities. Alternatively, the first device may send a signal, via a mobile network, Wi-Fi, or the like, that may trigger a response from the second device. The response may comprise an indication of the identity of the second device such as its IMEI, make, mode, or the like. In yet another embodiment, the first device may comprise specially equipped glasses that are configured to detect a device and render images associated with the identified device.

Still referring to FIG. 4, after the second device is identified, the first device may determine whether information associated with the second device is stored in the memory of the first device, at 406. For example, content may be updated periodically in an application on a phone (see FIG. 3). In a configuration in which a camera is used by the first device to create an image of the second device, the first device may determine whether information associated with the second device is stored on the first device by matching the created image with an image that is stored on the first device. For example, when a match of the image in the first device is made with an image seen by the camera, such as a logo or the like, the first device may retrieve content that is stored on the first device, at 408. At 412, content associated with the second device may be rendered and additional images may be rendered, for example, on the screen of the first device. If the test at 406 determines that content associated with the second device is not stored on the first device, the first device may retrieve content associated with the second device from an external source, such as the control server 200. For example, the control server 200 may deploy content to the first device 100, as described herein (e.g., see FIG. 3). After the content is deployed, the content may be rendered on a display (e.g., UI circuitry 108) of the first device, at 412. Once the content is retrieved, the content that is rendered on a display of the first device may comprise interactive content that describes features, accessories, pricing information, and/or properties of the first device.

For example, images and/or audio that is associated with the second device may be rendered by the first device. Rendered images may comprise a semi-transparent visual that may be static information on a screen or animated information on the screen. At 412, the rendered images on the first device may enable interaction by the user of the device with the content that is rendered on the device, for example, to view other content or place commands. For example, at 416, a user of the first device may activate a link that calls a salesperson to the user's location. A user may activate a link using a variety of mechanisms such as touching a link on the screen, rendering a voice command, selecting a link using a cursor, or the like. The content that is rendered on the first device may allow the customer to place an order, at 418. For example, a customer may activate an option to purchase a device that comprises the features of the second device.

Figure 6:
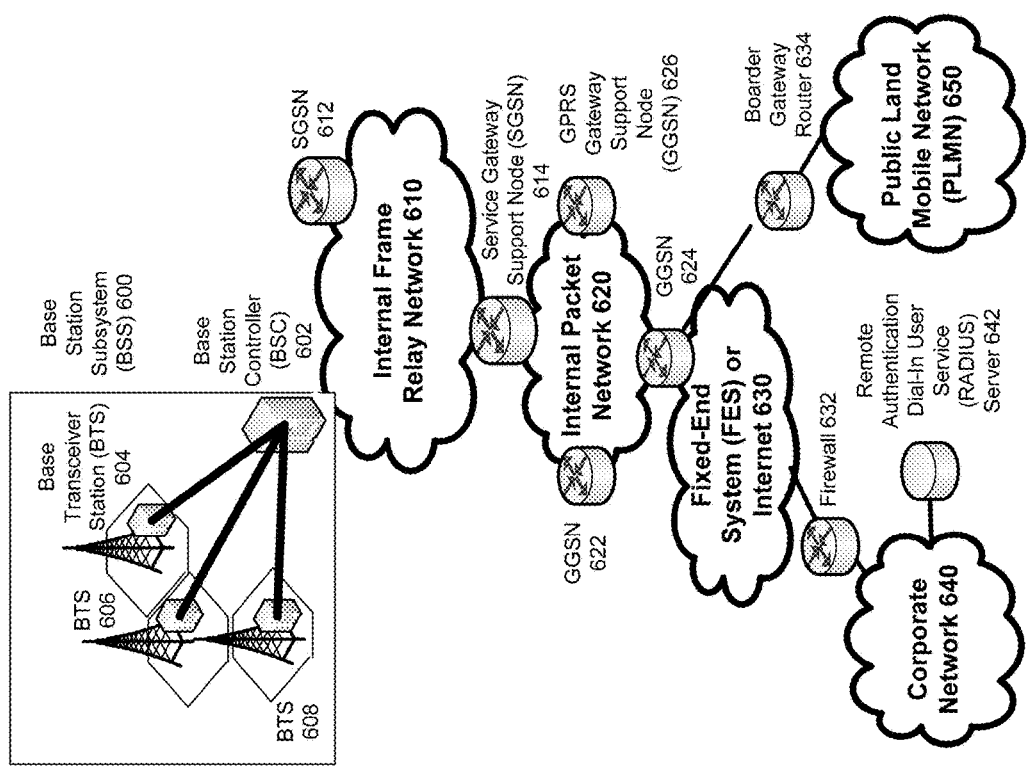
FIG. 6 depicts an overall block diagram of an exemplary packet-based mobile cellular network environment, such as a GPRS network, in which deploying and retrieving content may be implemented.

FIG. 6 depicts an overall block diagram of an exemplary packet-based mobile cellular network environment, such as a GPRS network, in which deployment of content to a device or retrieval of content by a device may be implemented. In the exemplary packet-based mobile cellular network environment shown in FIG. 6, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices become connected to the wireless network.

In exemplary fashion, the packet traffic originating from user devices is transported via an over-the-air interface to a BTS 608, and from the BTS 608 to the BSC 602. Base station subsystems, such as BSS 600, are a part of internal frame relay network 610 that can include Service GPRS Support Nodes ("SGSN") such as SGSN 612 and 614. Each SGSN is connected to an internal packet network 620 through which a SGSN 612, 614, etc. can route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via boarder gateway router 634. The Remote Authentication Dial-In User Service ("RADIUS") server 642 may be used for caller authentication when a user of a mobile cellular device calls corporate network 640.

Generally, there may be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 7:
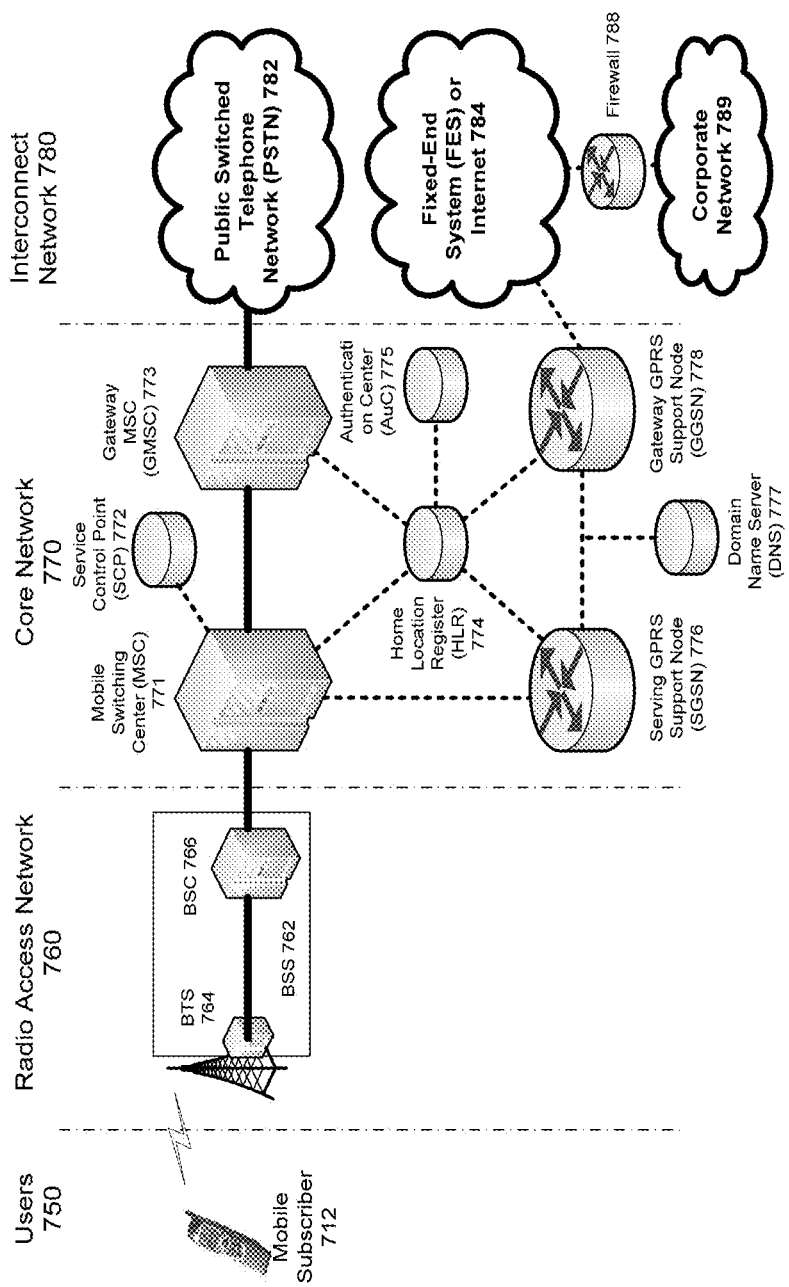
FIG. 7 illustrates an architecture of a typical GPRS network in which deploying content and retrieving content may be implemented.

FIG. 7 illustrates an architecture of a typical GPRS network in which deployment of content to a device may be implemented. The architecture depicted in FIG. 7 is segmented into four groups: users 750, radio access network 760, core network 770, and interconnect network 780. Users 750 comprise a plurality of end users. Note, device 712 is referred to as a mobile subscriber in the description of network shown in FIG. 7. In an example embodiment, the device depicted as mobile subscriber 712 comprises a communications device (e.g., communications device 104, communications device 300). Radio access network 760 comprises a plurality of base station subsystems such as BSSs 762, which include BTSs 764 and BSCs 766. Core network 770 comprises a host of various network elements. As illustrated in FIG. 7, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 7, interconnect network 780 comprises Public Switched Telephone Network ("PSTN") 782, Fixed-End System ("FES") or Internet 784, firewall 788, and Corporate Network 789.

A mobile switching center may be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 6, when mobile subscriber 712 initiates the attach process by turning on the network capabilities of the mobile device, an attach request is sent by mobile subscriber 712 to SGSN 776. The SGSN 776 queries another SGSN, to which mobile subscriber 712 was attached before, for the identity of mobile subscriber 712. Upon receiving the identity of mobile subscriber 712 from the other SGSN, SGSN 776 requests more information from mobile subscriber 712. This information is used to authenticate mobile subscriber 712 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 712 was attached before, to cancel the location process for mobile subscriber 712. HLR 774 then notifies SGSN 776 that the location update has been performed. At this time, SGSN 776 sends an Attach Accept message to mobile subscriber 712, which in turn sends an Attach Complete message to SGSN 776.

After attaching itself with the network, mobile subscriber 712 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 712. The mobile subscriber 712 uses an algorithm to send the user identification (ID) and password to SGSN 776. The SGSN 776 uses the same algorithm and compares the result. If a match occurs, SGSN 776 authenticates mobile subscriber 712.

Next, the mobile subscriber 712 establishes a user session with the destination network, corporate network 789, by going through a Packet Data Protocol ("PDP") activation process. Briefly, in the process, mobile subscriber 712 requests access to the Access Point Name ("APN"), for example, UPS.com, and SGSN 776 receives the activation request from mobile subscriber 712. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 can access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 712.

Once activated, data packets of the call made by mobile subscriber 712 can then go through radio access network 760, core network 770, and interconnect network 780, in a particular fixed-end system or Internet 784 and firewall 788, to reach corporate network 789.

Figure 8:
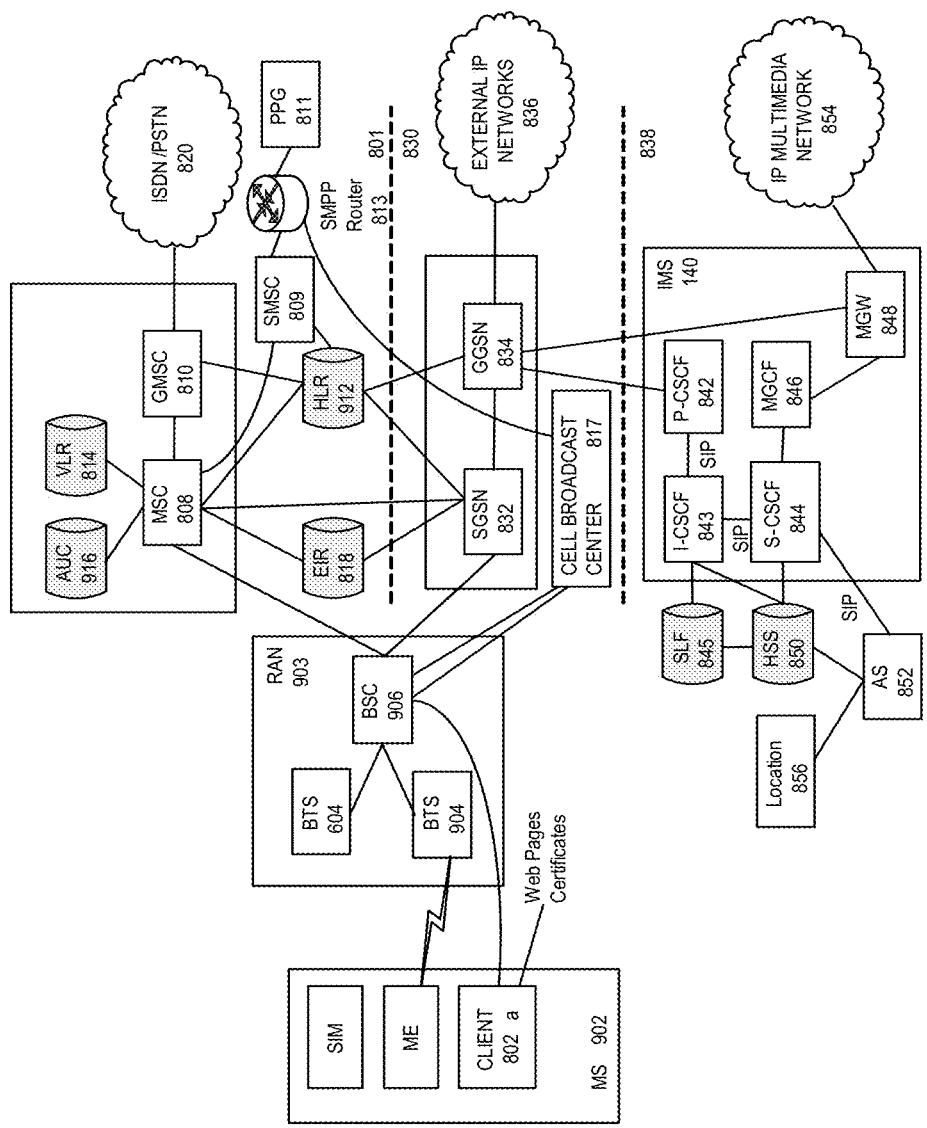
FIG. 8 illustrates an exemplary block diagram view of a GSM/GPRS/IP multimedia network architecture within deploying and retrieving content may be implemented.

FIG. 8 illustrates an exemplary block diagram view of a GSM/GPRS/IP multimedia network architecture within which providing a message to an emergency call center may be implemented. As illustrated, the architecture of FIG. 8 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (e.g., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 817 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 830 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 838 was introduced with 3GPP Release 8, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber, if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides user-plane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 9:
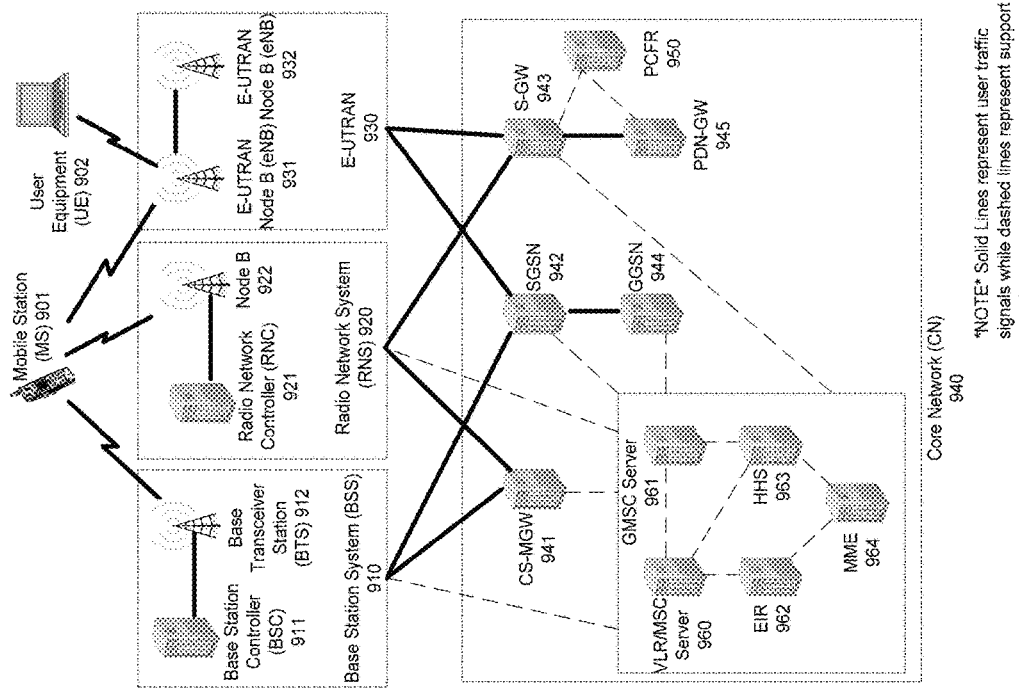
FIG. 9 illustrates a PLMN block diagram view of an exemplary architecture in which deploying and retrieving content may be incorporated.

FIG. 9 illustrates a PLMN block diagram view of an exemplary architecture in which deployment of content to a device and retrieval of content by a device may be incorporated. Mobile Station (MS) 901 is the physical equipment used by the PLMN subscriber. In one illustrative embodiment, communications device 100 may serve as Mobile Station 901. Mobile Station 901 may be one of, but not limited to, a cellular telephone, a cellular telephone in combination with another electronic device or any other wireless mobile communication device.

Mobile Station 901 may communicate wirelessly with Base Station System (BSS) 910. BSS 910 contains a Base Station Controller (BSC) 911 and a Base Transceiver Station (BTS) 912. BSS 910 may include a single BSC 911/BTS 912 pair (Base Station) or a system of BSC/BTS pairs which are part of a larger network. BSS 910 is responsible for communicating with Mobile Station 901 and may support one or more cells. BSS 910 is responsible for handling cellular traffic and signaling between Mobile Station 901 and Core Network 940. Typically, BSS 910 performs functions that include, but are not limited to, digital conversion of speech channels, allocation of channels to mobile devices, paging, and transmission/reception of cellular signals.

Additionally, Mobile Station 901 may communicate wirelessly with Radio Network System (RNS) 920. RNS 920 contains a Radio Network Controller (RNC) 921 and one or more Node(s) B 922. RNS 920 may support one or more cells. RNS 920 may also include one or more RNC 921/Node B 922 pairs or alternatively a single RNC 921 may manage multiple Nodes B 922. RNS 920 is responsible for communicating with Mobile Station 901 in its geographically defined area. RNC 921 is responsible for controlling the Node(s) B 922 that are connected to it and is a control element in a UMTS radio access network. RNC 921 performs functions such as, but not limited to, load control, packet scheduling, handover control, security functions, as well as controlling Mobile Station 901's access to the Core Network (CN) 940.

The evolved UMTS Terrestrial Radio Access Network (E-UTRAN) 930 is a radio access network that provides wireless data communications for Mobile Station 901 and User Equipment 902. E-UTRAN 930 provides higher data rates than traditional UMTS. It is part of the Long Term Evolution (LTE) upgrade for mobile networks and later releases meet the requirements of the International Mobile Telecommunications (IMT) Advanced and are commonly known as a 4 G networks. E-UTRAN 930 may include of series of logical network components such as E-UTRAN Node B (eNB) 931 and E-UTRAN Node B (eNB) 932. E-UTRAN 930 may contain one or more eNBs. User Equipment 902 may be any user device capable of connecting to E-UTRAN 930 including, but not limited to, a personal computer, laptop, mobile device, wireless router, or other device capable of wireless connectivity to E-UTRAN 930. The improved performance of the E-UTRAN 930 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 9 is the Enhanced Data rates for GSM Evolution (EDGE). EDGE is an enhancement for GPRS networks that implements an improved signal modulation scheme known as 9-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 901 may communicate with any or all of BSS 910, RNS 920, or E-UTRAN 930. In a illustrative system, each of BSS 910, RNS 920, and E-UTRAN 930 may provide Mobile Station 901 with access to Core Network 940. The Core Network 940 may include of a series of devices that route data and communications between end users. Core Network 940 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 941 is part of Core Network 940, and interacts with Visitor Location Register (VLR) and Mobile-Services Switching Center (MSC) Server 960 and Gateway MSC Server 961 in order to facilitate Core Network 940 resource control in the CS domain. Functions of CS-MGW 941 include, but are not limited to, media conversion, bearer control, payload processing and other mobile network processing such as handover or anchoring. CS-MGW 940 may receive connections to Mobile Station 901 through BSS 910, RNS 920 or both.

Serving GPRS Support Node (SGSN) 942 stores subscriber data regarding Mobile Station 901 in order to facilitate network functionality. SGSN 942 may store subscription information such as, but not limited to, the International Mobile Subscriber Identity (IMSI), temporary identities, or Packet Data Protocol (PDP) addresses. SGSN 942 may also store location information such as, but not limited to, the Gateway GPRS Support Node (GGSN) 944 address for each GGSN where an active PDP exists. GGSN 944 may implement a location register function to store subscriber data it receives from SGSN 942 such as subscription or location information.

Serving Gateway (S-GW) 943 is an interface which provides connectivity between E-UTRAN 930 and Core Network 940. Functions of S-GW 943 include, but are not limited to, packet routing, packet forwarding, transport level packet processing, event reporting to Policy and Charging Rules Function (PCRF) 950, and mobility anchoring for inter-network mobility. PCRF 950 uses information gathered from S-GW 943, as well as other sources, to make applicable policy and charging decisions related to data flows, network resources and other network administration functions. Packet Data Network Gateway (PDN-GW) 945 may provide user-to-services connectivity functionality including, but not limited to, network-wide mobility anchoring, bearer session anchoring and control, and IP address allocation for PS domain connections.

Home Subscriber Server (HSS) 963 is a database for user information, and stores subscription data regarding Mobile Station 901 or User Equipment 902 for handling calls or data sessions. Networks may contain one HSS 963 or more if additional resources are required. Exemplary data stored by HSS 963 include, but is not limited to, user identification, numbering and addressing information, security information, or location information. HSS 963 may also provide call or session establishment procedures in both the PS and CS domains.

The VLR/MSC Server 960 provides user location functionality. When Mobile Station 901 enters a new network location, it begins a registration procedure. A MSC Server for that location transfers the location information to the VLR for the area. A VLR and MSC Server may be located in the same computing environment, as is shown by VLR/MSC Server 960, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 901 registration or procedures for handover of Mobile Station 901 to a different section of the Core Network 940. GMSC Server 961 may serve as a connection to alternate GMSC Servers for other mobile stations in larger networks.

Equipment Identity Register (EIR) 962 is a logical element which may store the International Mobile Equipment Identities (IMEI) for Mobile Station 901. In a typical embodiment, user equipment may be classified as either "white listed" or "black listed" depending on its status in the network. In one embodiment, if Mobile Station 901 is stolen and put to use by an unauthorized user, it may be registered as "black listed" in EIR 962, preventing its use on the network. Mobility Management Entity (MME) 964 is a control node which may track Mobile Station 901 or User Equipment 902 if the devices are idle. Additional functionality may include the ability of MME 964 to contact an idle Mobile Station 901 or User Equipment 902 if retransmission of a previous session is required.

While example embodiments of generating, deploying, and providing content on a communications device are described in connection with various mobile phones/tablets, the underlying concepts can be applied to any computing device, processor, and/or system capable of providing content to a customer as described herein. The methods and apparatuses for deploying and providing content on a mobile device, or certain aspects or portions thereof, can take the form of program code (e.g., instructions) embodied in tangible storage media having a physical structure, such as floppy diskettes, CD-ROMs, hard drives, or any other machine-readable storage medium having a physical tangible structure (computer-readable storage medium), wherein, when the program code is loaded into and executed by a machine, such as a computer, the machine becomes an apparatus for facilitating generation of a message for an emergency call center. A computer-readable storage medium, as described herein is an article of manufacture, and thus, not to be construed as a transient signal. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for deploying content to a mobile communications device and rendering content on a mobile communications device may be practiced via communications embodied in the form of program code that is transmitted over some transmission medium, such as over electrical wiring or cabling, through fiber optics, wherein, when the program code is received and loaded into and executed by a machine, such as an EPROM, a gate array, a programmable logic device (PLD), a client computer, or the like, the machine becomes an apparatus for facilitating initiation of a call to an emergency call center. When implemented on a general-purpose processor, the program code combines with the processor to provide a unique apparatus that operates to invoke the functionality for initiating a call to an emergency call center.

While deploying content to and displaying content on a communications device has been described in connection with the various embodiments of the various figures, it is to be understood that other similar embodiments can be used or modifications and additions can be made to the described embodiments. For example, deploying content and displaying content as described in the present application may apply to any environment, whether wired or wireless, and may be applied to any number of devices connected via a communications network and interacting across the network. Therefore, deploying content to a communications device and displaying content on a communications device. should not be limited to any single embodiment, but rather should be construed in breadth and scope in accordance with the appended claims.

What is claimed:

1. A non-transitory computer-readable storage medium having instructions stored thereon, the instructions, when executed by a processor, cause the processor to effectuate operations comprising:
   detecting a second device using a sensor of a first device, wherein the first device includes specially equipped glasses having a display, and wherein the sensor is at least in part incorporated in specially equipped glasses;
   identifying the second device based on collected sensor data;
   determining whether second device information associated with the identification of the second device is stored locally on the first device or on an external server;
   in response to detecting and identifying the second device, retrieving the second device information from the external server if the second device information is not stored locally on the first device; and
   rendering, via the specially equipped glasses of the first device, the retrieved information that comprises interactive content that describes the second device, wherein the interactive content is rendered based on one or more parameters associated with a store in which the second device is located, wherein the interactive content is semi-transparent, and wherein the one or more parameters indicate a language in which the interactive content is rendered.

2. The computer-readable storage medium of claim 1, wherein detecting the second device comprises at least one of:
   visually detecting the second device, wherein the sensor is a camera; or
   electromagnetically detecting the second device, wherein the sensor is an electromagnetic sensor.

3. The computer-readable storage medium of claim 1, wherein:
   detecting the second device comprises:
      visually detecting an identifier of the second device, wherein the sensor is a camera; and
      matching an image of the identifier to a stored image, wherein the stored image comprises at least one of a model number or a make type of the second device.

4. The computer-readable storage medium of claim 3, wherein the identifier comprises at least one of a model number, a make type, or a logo associated with an identity of the second device.

5. The computer-readable storage medium of claim 1, wherein identifying the second device further comprises:
   receiving an indication of an identity of the second device, wherein the indication comprises an international mobile equipment identity.

6. The computer-readable storage medium of claim 1, the operations further comprising:
   in response to a user interaction with the first device, calling a salesperson to a location of the first device.

7. The computer-readable storage medium of claim 1, the operations further comprising:
   in response to a user interaction with the first device, placing an order to purchase the second device.

8. A first device comprising:
   a set of specially equipped glasses having a display;
   a sensor configured to collect sensor data, wherein the sensor is at least in part incorporated in specially equipped glasses;
   memory comprising executable instructions; and
   a processor in communications with the memory, the instructions, when executed by the processor, cause the processor to effectuate operations comprising:
      detecting a second device using the sensor;
      identifying the second device based on the sensor data;
      determining whether second device information associated with the identification of the second device is stored locally on the first device or on an external server;
      in response to detecting and identifying the second device, retrieving the second device information from the external server if the second device information is not stored locally on the first device; and
      rendering the retrieved information on the display of the specially equipped glasses of the first device, wherein the retrieved information comprises interactive content that describes the second device, wherein the interactive content is rendered based on one or more parameters associated with a store in which the second device is located, wherein the interactive content is semi-transparent, and
      wherein the one or more parameters indicate a language in which the interactive content is rendered.

9. The first device of claim 8, wherein detecting the second device comprises:
   visually detecting the second device, wherein the sensor is a camera; or
   electromagnetically detecting the second device, wherein the sensor is an electromagnetic sensor.

10. The first device of claim 8, wherein:
   detecting the second device comprises:
      visually detecting an identifier of the second device, wherein the sensor is a camera; and
      matching an image of the identifier to a stored image, wherein the stored image comprises at least one of a model number or a make type of the second device.

11. The first device of claim 10, wherein the identifier comprises at least one of a model number, a make type, or logo associated with an identity of the second device.

12. The first device claim 8, wherein sensing the second device further comprises:
   receiving an indication of an identity of the second device, wherein the indication comprises an international mobile equipment identity.

13. The first device of claim 8, the operations further comprising:
   in response to a user interaction with the first device, calling a salesperson to a location of the first device.

14. The first device of claim 8, the operations further comprising:
   in response to a user interaction with the first device, placing an order to purchase the second device.

15. The computer-readable storage medium of claim 1, wherein the second device is configured to store the second device information, wherein the second device information includes default content and updated content, wherein the default content is provided to the first device if no updated content is received or updated content conditions are not met, and wherein the updated content is provided to the first device for rendering if updated content is received and updated content conditions are met.

16. The computer-readable storage medium of claim 15, wherein the updated content includes specialized content.

17. The first device of claim 8, wherein the memory stores an application for detecting other devices.

* * * * *